United States Patent [19]

Hennon et al.

[11] Patent Number: 4,771,525
[45] Date of Patent: Sep. 20, 1988

[54] METHOD AND APPARATUS FOR MAKING BEARING CAP

[75] Inventors: Erin D. Hennon, Lima; Thomas J. Keller, Cridersville, both of Ohio

[73] Assignee: Dana Corporation, Toledo, Ohio

[21] Appl. No.: 81,954

[22] Filed: Aug. 5, 1987

Related U.S. Application Data

[62] Division of Ser. No. 803,586, Dec. 2, 1985, Pat. No. 4,710,038.

[51] Int. Cl.$^4$ .................. B21D 53/10; B23D 41/06
[52] U.S. Cl. .................. 29/149.5 R; 29/564.7; 409/244; 409/263
[58] Field of Search .............. 29/148.4 R, 149.5 C, 29/149.5 R, 557, 558, 564.7; 409/244, 257, 263, 271, 276, 293, 132

[56] References Cited

U.S. PATENT DOCUMENTS

| | | | |
|---|---|---|---|
| 2,080,464 | 5/1937 | Doan | 409/263 |
| 2,315,006 | 3/1943 | Misch | 29/149.5 R |
| 2,479,026 | 8/1949 | Schiltz | 409/257 |
| 2,955,516 | 10/1960 | Freter | 409/257 |
| 3,568,569 | 3/1971 | Haley | 409/263 |
| 4,531,868 | 7/1985 | Gabriele | 409/244 X |

FOREIGN PATENT DOCUMENTS

| | | | |
|---|---|---|---|
| 829357 | 5/1981 | U.S.S.R. | 409/257 |
| 992137 | 2/1983 | U.S.S.R. | 409/244 |

Primary Examiner—William R. Briggs
Attorney, Agent, or Firm—MacMillan, Sobanski & Todd

[57] ABSTRACT

The present invention concerns a unique method and apparatus for machining a bearing cap assembly of the type typically utilized in a universal joint mechanism. The bearing cap assembly includes an open-ended bearing cap having a closed end wall with an outer surface secured to a mounting plate located generally parallel to the end wall and having spaced apart opposite end portions extending outwardly past the bearing cap. The present invention is specifically concerned with machining the end portions of the mounting plate extending outwardly from the bearing cap to produce spaced apart machined surfaces which can be utilized to attach the bearing cap assembly to an associated yoke arm. In the method of the present invention, the open end of the cap is placed on a support pin having a stop surface adapted to engage the inner surface of the end wall of the bearing cap. Next, the support pin having the bearing cap assembly supported thereon is moved in a predetermined direction with the mounting plate located in a plane generally parallel to the direction to travel. As the bearing cap assembly and support pin are moved past a machining device, a force is exerted on the bearing cap in a direction perpendicular to the direction of travel to urge the inner surface of the end wall of the cap into positive engagement with the stop surface of the support pin.

11 Claims, 3 Drawing Sheets

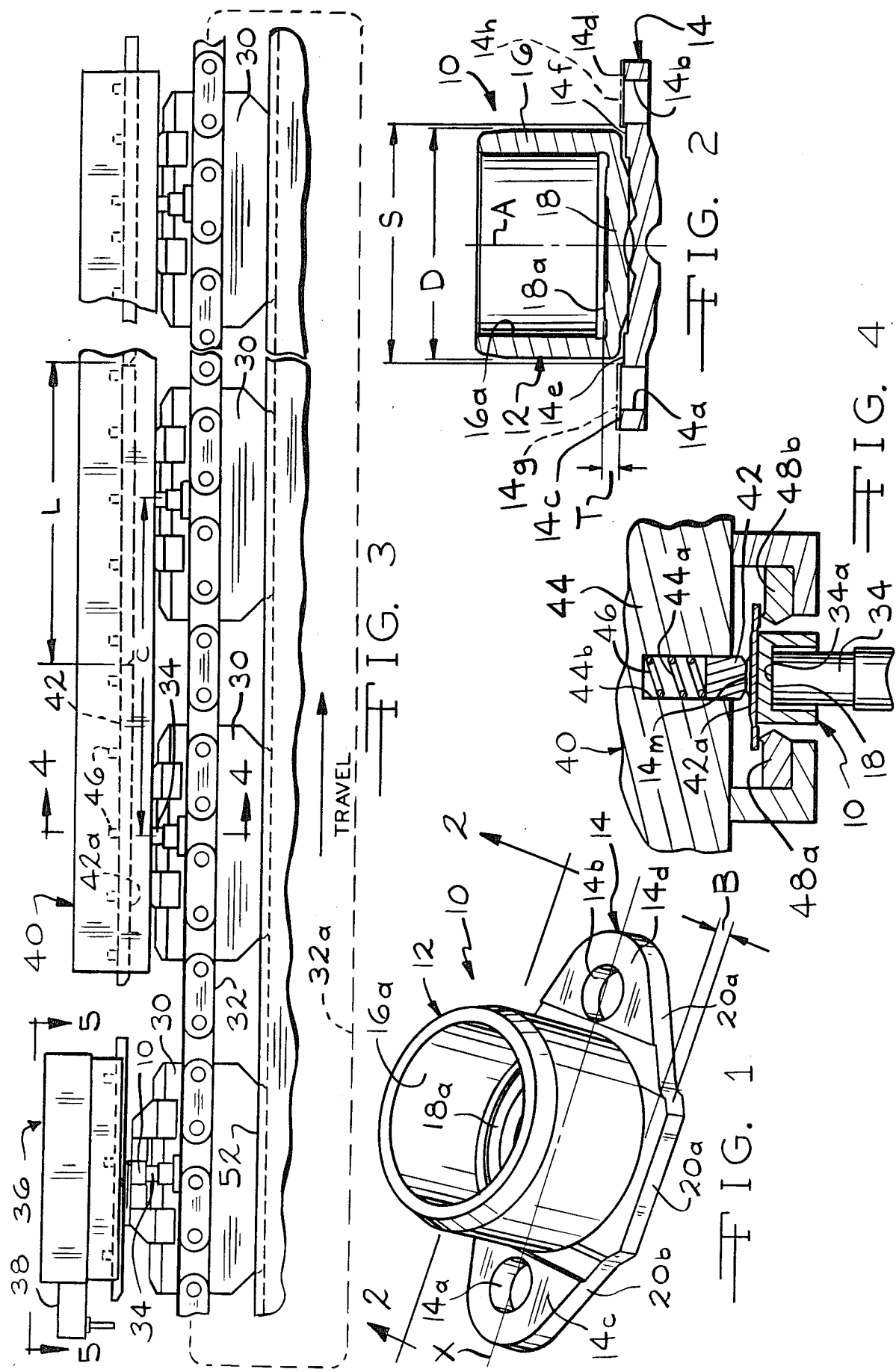

METHOD AND APPARATUS FOR MAKING BEARING CAP

This is a division, of application Ser. No. 803,586, filed Dec. 2, 1985 U.S. Pat. No. 4,710,038.

BACKGROUND OF THE INVENTION

The present invention relates generally to a bearing cap and mounting plate assembly of the type typically utilized in a universal joint mechanism and, in particular, to a method and apparatus for machining the surfaces of the mounting plate which are adapted to engage an associated universal joint yoke arm.

Bearing cap assemblies of the type utilized in a universal joint mechanism typically include an open ended cup-shaped member having a cylindrical sidewall and a closed end wall which is securely attached to an associated mounting plate. The mounting plate is utilized to secure the bearing cap relative to the yoke arms of a universal joint yoke assembly. Examples of such bearing cap assemblies are disclosed in U.S. Pat. Nos. 2,291,436 and 2,315,006.

One of the difficulties in producing universal joint bearing cap assemblies relates to the strict tolerances which much be observed during the manufacturing operation. For example, typically, the inner surface of the bearing cap sidewall, which provides an outer bearing race for an associated roller bearing unit, must be precisely located relative to a pair of spaced apart mounting holes provided in the mounting plate. Also, the surfaces of the mounting plate which are adapted to engage cooperating mounting surfaces formed on the associated yoke arm must be precisely located relative to the inner surface of the end wall of the bearing cap.

In the past, in order to maintain such tolerances, it has been necessary to utilize a drill press unit with an associated cutting tool for machining the mounting plate surfaces. While such a machining operation produces a quality part, the production rate of such an operation is relatively slow.

U.S. Pat. No. 2,291,436 discloses the use of a pair of spaced apart broaches for machining spaced apart mounting surfaces on the attaching strap of a universal joint bearing cap. However, the broaching operation as disclosed in this patent does not lend itself to a high production operation.

SUMMARY OF THE INVENTION

The present invention concerns a unique method and apparatus for machining a bearing cap assembly which can be utilized, for example, in a universal joint mechanism. The present invention also concerns a unique bearing cap assembly which is produced by means of the method and apparatus disclosed herein.

In particular, the bearing cap assembly includes an open ended bearing cap having an axis and including a generally cylindrical sidewall parallel to the axis, and a closed end wall attached to the sidewall and perpendicular to the axis. A mounting plate is located generally parallel to and is securely attached to the end wall of the bearing cap. The mounting plate includes a mounting surface in facing relationship with the bearing cap. The mounting surface includes a central surface portion secured to the outer surface of the end wall and two spaced apart end portions located on opposite sides of the central surface portion and spaced outwardly past the sidewall of the bearing cap. The end surface portions are spaced from one another by a distance at least as great as the outer diameter of the bearing cap and are raised relative to the adjacent areas of the central surface portion.

In the method of the present invention, the open end of the bearing cap is first placed on a support pin having a stop surface adapted to engage the inner surface of the end wall of the bearing cap. Next, the support pin having the bearing cap assembly supported thereon is moved in a predetermined direction with the mounting plate located in a plane generally parallel to the direction of travel. As the support pin and the bearing cap assembly are moved, a force is exerted on the bearing cap assembly in a direction perpendicular to the direction of travel to urge the inner surface of the end wall of the cap into positive engagement with the stop surface of the support pin. While the cap is urged toward the support pin, the end portions of the mounting plate extending outwardly of the bearing cap are machined to produce spaced apart machine surfaces generally parallel to the direction of travel of the bearing cap assembly.

As will be discussed herein, the apparatus of the present invention includes means for performing the above described method steps.

BRIEF DESCRIPTION OF THE DRAWINGS

FIG. 1 is a perspective view of a bearing cap assembly having a unique structure and produced according to the method and apparatus of the present invention;

FIG. 2 is a sectional view of the bearing cap assembly taken along the line 2—2 of FIG. 1;

FIG. 3 is a side elevational, schematic view illustrating the overall structure of the machining apparatus of the present invention;

FIG. 4 is a sectional view taken along the line 4—4 of FIG. 3 and illustrating the spring bias hold down bar utilized to urge the inner surface of the end wall of the bearing cap into positive engagement with the stop surface of the support pin;

DESCRIPTION OF THE PREFERRED EMBODIMENT

Figure 5:
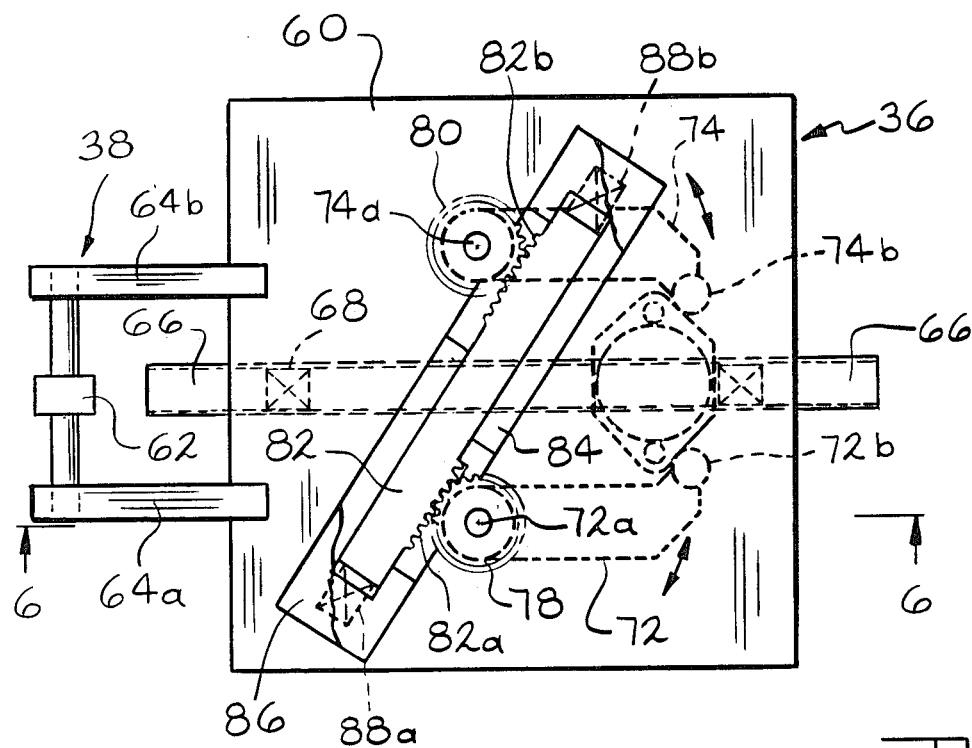
FIG. 5 is a top elevational view taken along the line 5—5 of FIG. 3 and illustrating in more detail the positioning means of the present invention which includes a pair of pivotally mounted flipper arm to properly orient the bearing cap on the support pin prior to the broaching operation.

Referring to FIG. 1, there is shown a perspective view of a bearing cap and mounting plate assembly 10 having a structure according to the present invention. A sectional view of the bearing cap assembly 10 of FIG. 1 is shown in FIG. 2. The bearing cap assembly 10 includes an open ended bearing cap 12 (having an axis A) which is secured to a mounting plate 14 generally perpendicular to the axis A. The bearing cap 12 includes a generally cylindrical sidewall 16 and a closed end wall 18. The inner surface 16a of the sidewall 16 is machined and provides an outer bearing race for a roller bearing unit (not shown) for rotatably supporting one end of a universal joint trunion (not shown). The extreme outer end surface of the trunion is adapted to abut against a machined surface 18a formed on the inner side of the end wall 18. The outer surface of the end wall 18 is securely fastened by welding, for example to the mounting plate 14. The mounting plate 14 is provided with spaced apart apertures 14a and 14b for receiving suitable threaded fasteners for fastening the bearing cap and mounting plate assembly and to an associated yoke arm (not shown) of a universal joint assembly.

The present invention is specifically concerned with a method and apparatus for machining a pair of spaced apart mounting surfaces 14c and 14d which, as viewed in FIG. 2, face upwardly toward the open end of the bearing cup 12. The surfaces 14c and 14d are located on opposite sides of the bearing cap 12 and are spaced outwardly past the sidewall of the bearing cap. The surfaces 14c and 14d are spaced apart by a distance S which is at least as great as the outside diameter D of the bearing cap, and are raised relative to the adjacent surface portions 14e and 14f respectively. Prior to machining, the mounting plate 14 includes unfinished end surface portions which are shown in phantom in FIG. 2 and are represented by reference numerals 14g and 14h. As will be discussed, a bearing cap assembly having such a structure enables the mounting surfaces 14c and 14d to be machined by a pair of spaced apart, longitudinally extending stationary broaches as the bearing cap is moved in a longitudinal path.

It should be noted that the machining operation of the surfaces of 14c and 14d must be performed within a strict tolerance range. More specifically, the distance T (shown in FIG. 2) between the machined surface 18a on the inner side of the end wall 18 and the machined surfaces 14c and 14d must be within a predetermined tolerance range in order to ensure proper operation of the universal joint mechanism.

As shown in FIG. 1, the mounting plate 14 is provided with a flat surface portion 20a and spaced apart angled portions 20b and 20c which, as will be discussed, are utilized to properly orient the beaming cap assembly prior to the machining operation. The flat surface portion 20a is spaced outwardly from the outer sidewall of the bearing cap by a distance B.

The method and apparatus of the present invention enables the surfaces 14c and 14d of the mounting plate to be machined within the predetermined tolerance range while also achieving a relatively high rate of production. There is shown in FIG. 3 a schematic drawing illustrating the overall structure of the machine apparatus of the present invention. Basically, the apparatus includes a plurality of individual transport cars 30 which are interconnected by an endless chain 32 (the lower portion of which is represented by dashed line 32a). The transport cars 30 each include a support pin 34 utilized to support a separate bearing cap assembly 10 with the open end of the bearing cup and the unfinished surfaces 14g and 14h facing downwardly. The chain 32 is driven by an external drive source (not shown) and is utilized to move the cars 30 in a linear path at a predetermined rate of speed.

Initially, and prior to any machining of the surfaces 14g and 14h, the transport car 30 carrying the bearing cap assembly having unfinished surfaces 14g and 14h is moved through a positioning means 36. A limit switch unit 38 is located at the forward end of the positioning means to ensure that the bearing cap assembly 10 has been properly placed on the associated support pin 34. As will be discussed, the positioning means 36 includes a flipper assembly which is utilized to properly orient the bearing cap assembly on the support pin. Once the bearing cap assembly has been properly oriented, the car 30 transports the bearing cap assembly to a machining tunnel 40 which, in the preferred embodiment of the invention, includes a pair of longitudinally extending spaced apart broach cutters (not shown in FIG. 3) for machining the surfaces 14c and 14d.

One of the important features of both the method and apparatus of the present invention is related to the manner in which the bearing cap assembly 10 is held in position during both the positioning and the machining operation. More specifically, referring to FIG. 4, which is a section taken through the machining tunnel 40 along the line 4—4 of FIG. 3, there is shown a spring bias hold down bar 42 which is utilized to urge the inside machined surface 18a of the end wall 18 into positive engagement with an upper stop surface 34a provided on the upper end of the support pin 34 of the car 30. As shown in FIG. 4, the machining apparatus includes an upper main body 44 having a downwardly facing longitudinally extending slot 44a formed therein for receiving the hold down bar 42. A spring cavity 44b extends upwardly from the slot 44a for receiving a helical coil spring 46 for exerting a downward force on the hold down bar 42. The hold down bar 42 is provided with a lower surface 42a which engages an outer upwardly facing surface 14m of the mounting plate 14. Also shown in FIG. 4 are a pair of spaced apart broaches 48a and 48b which are securely mounted relative to the main body 44 and are utilized to machine the surfaces 14c and 14d as the support pin 34 having the bearing cap assembly 10 mounted thereon is moved through the machining tunnel.

Referring to FIGS. 5 through 8, the transport cars 30, the positioning means 36, and the machining tunnel 40, all of which are schematically shown in FIG. 3, will now be discussed in more detail. One of the transport cars 30 is shown in more detail in FIGS. 7 and 8. More specifically, each transport car 30 includes a main body portion 50 which is securely coupled to the drive chain 32 for slidable movement along a lower guide track 52 (shown in FIG. 3). The support pin 34 having the upper stop surface 34a is securely mounted relative to the main body portion 50. The car 50 is also provided with a pair of cooperating clamping members 54 and 56 which include V-shaped clamping surfaces 54a and 56a respectively for securely engaging the outer surface of the cylindrical shell of the bearing cap assembly 10 (shown in phantom in FIGS. 7 and 8) during the machining operation. The clamping member 54 can further include a raised flat portion 56b engageable with the flat surface portion 20a of the mountrrng plate 14 to provide initial positioning of the bearing cap. The clamping member 54 is securely mounted relative to the body 50, while the clamping member 56 is mounted for selective axial movement toward and away from the support pin 34, as represented by direction arrows R.

Figure 7:
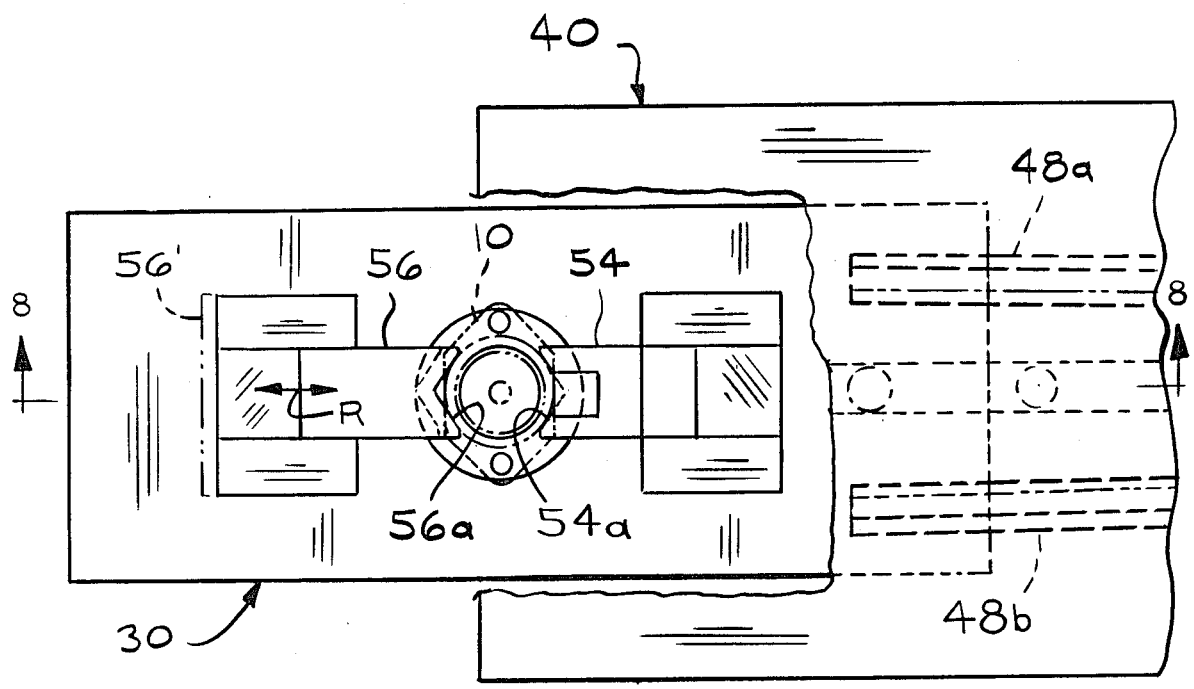
FIG. 7 is a top elevational view of the broaching tunnel illustrating a bearing cap assembly in position as it enters the broaching tunnel.
Figure 8:
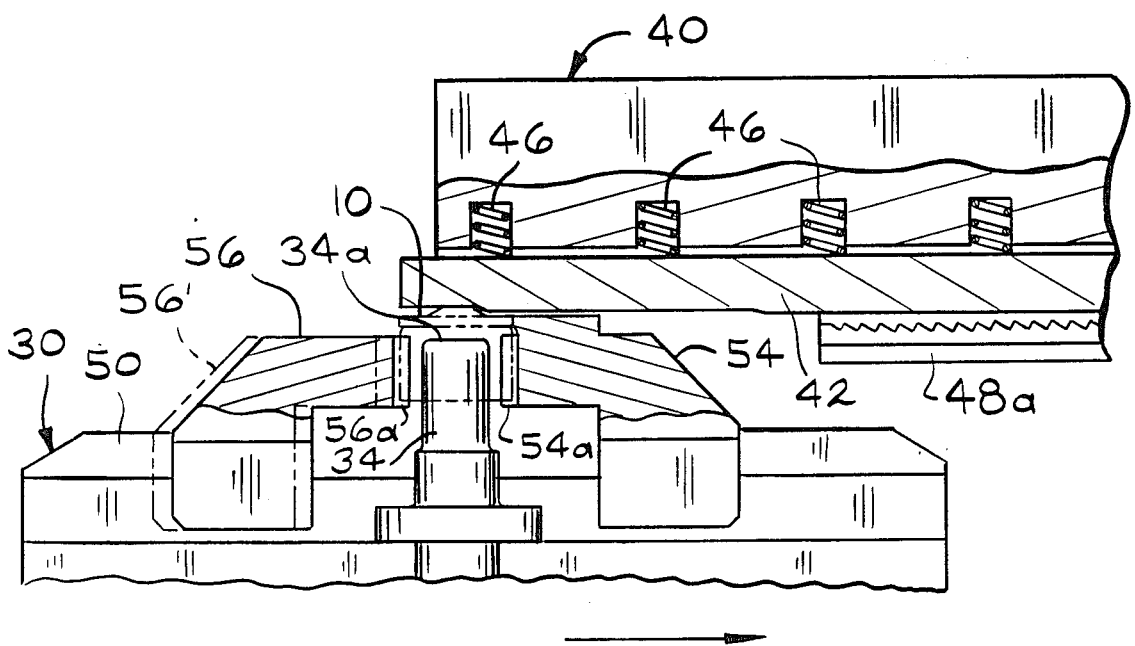
FIG. 8 is a side elevational view, partly in section, taken along the line 8—8 of FIG. 7.

In FIGS. 7 and 8, the solid line position of the clamping member 56' represents its clamped position, while the phantom position 56' represents its unclamped position. As will be discussed, the clamping member 56 is maintained in its unclamped position until the bearing cap assembly has been properly oriented by the positioning means 36. At that time, the clamping member 56 can be moved toward the clamping member 54 to securely grasp the bearing cap assembly. While not shown in the drawings, conventional means can be provided for controlling the movement of the clamping member 56. It should be noted that, in some instances, it may be desirable to fix the rear clamping member 56, and mount the front clamping member 54 for selective axial movement.

Figure 6:
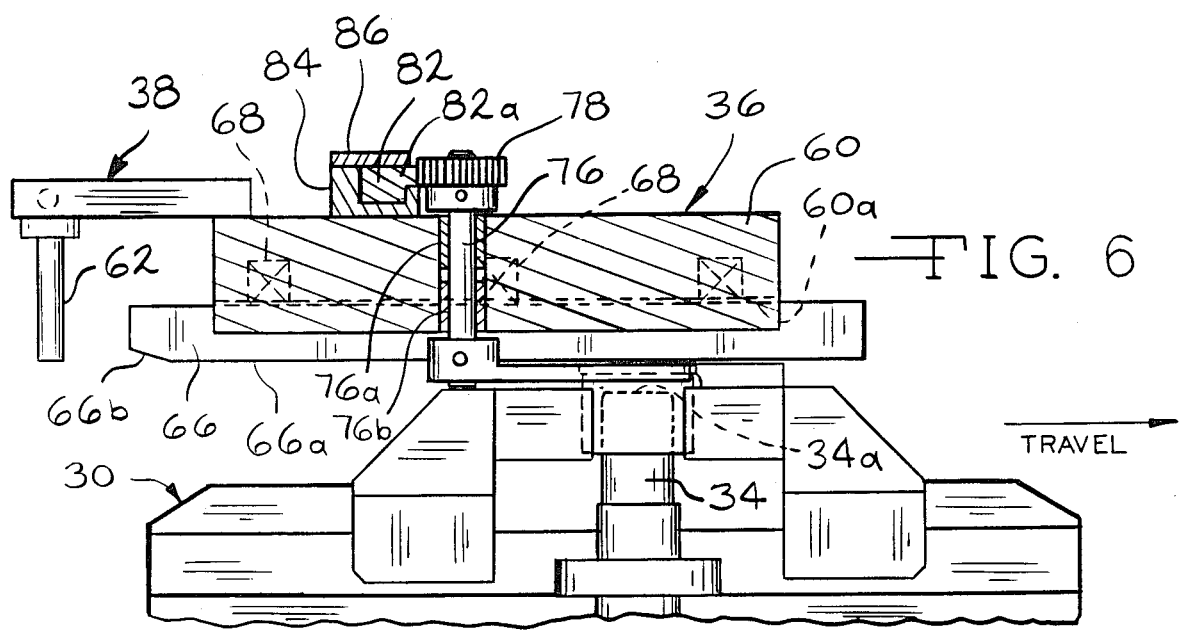
FIG. 6 is a side elevational view, partly in section, taken along the line 6—6 of FIG. 5 and illustrating one of the pivotally mounted flipper arms of the positioning means of FIG. 5.

The positioning means 36 is shown in more detail in FIGS. 5 and 6. The positioning means includes a main body 60 which is supported by suitable support means (not shown) above the transport car and drive assembly. Prior to entering the positioning means, the transport car having the bearing cap assembly placed on its support pin must pass the limit switch unit 38. The switch unit includes a toggle member 62 pivotally mounted to support arm 64a and 64b attached to the main body 60. In the event the bearing cap is not properly placed upon the support pin, the limit switch 38 will trip and provide a signal which can be used to stop the drive assembly and prevent damage to the positioning means due to the misplaced part.

The positioning means includes a hold down bar 66 similar in structure to the hold down bar 44 of the machining means shown in FIG. 4. The bar 66 extends longitudinally within a downwardly facing slot 60a formed in the lower side of the main body portion 60. The hold down bar 66 includes a downwardly facing workpiece engaging surface 66a which is spring biased into engagement with the outer upwardly facing surface 14m of the mounting plate 14 of the bearing cap assembly 10 by means of a plurality of helical coil springs 68 mounted within spring cavities formed in the main body portion 60. The leading edge of the workpiece engaging surface 66a is provided with an inclined portion 66b for initially engaging the bearing cap assembly. As previously mentioned, the hold down bar 66 functions to maintain the inner surface 18a of the end wall 18 in positive engagement with the upper support surface 34a of the support pin 34.

As previously mentioned, the positioning means 36 includes a flipper assembly for properly orienting the bearing cap assembly on the support pin 34 prior to transporting the bearing cap assembly through the machining tunnel. The flipper assembly includes flipper arms 72 and 74 pivotally mounted at 72a and 74b and having outer end portions 72b and 74b for engaging inclined surfaces of the mounting plate.

Each of the flipper arms 72 and 74 are secured to a shaft rotatably supported by the main body 60. For example, in FIG. 6, the flipper arm 72 is secured to the lower end of a shaft 76 which is rotatably supported by means of bushings 76a and 76b. The upper end of the shaft 76 is provided with a pinion gear 78. The other flipper arm 74 is rotatably supported within the main body in a similar manner and, as shown in FIG. 5, is coupled to an upper pinion gear 80. The movement of the flipper arm 72 and 74 is synchronized by an elongate rack member 82 having a toothed portion 82a along one side thereof engageable with the pinion gear 78 and a tooth portion 82b along the opposite side engageable with the pinion gear 80. The rack member 82 is supported within a guide block 84 having a cover plate 86. The end portions of the rack member 82 are engageable with helical coil springs 88a and 88b. The springs 88a and 88b function to maintain the rack member 82 in a position such that the flipper arm 72 and 74 are normally pivoted inwardly toward one another.

As a transport car carries a bearing cap assembly through the positioning means the rear clamping member 56 of the transport car 30 is in its unclamped position (position 56' shown in FIGS. 7 and 8). As the bearing cap assembly approaches the flipper arms 72 and 74, the bearing cap assembly 10 is biased downwardly by the hold down bar 66. When one of the angled surfaces 20b or 20c of the mounting plate of the bearing cap assembly contacts at least one of the end portions 72b and 74b of the flipper arms 72 and 74, the contacted flipper arm will cause the bearing cap 10 to be rotated about the support pin 34 until the other one of the flipper arms has engaged the respective inclined surface. It should be noted that the downward force exerted by the hold down bar is not so great as to prevent rotation of the cap 10 by the initially contacted flipper arm. When both flipper arms have contacted their respective inclined surfaces, the flipper arms will simultaneously be pivoted outwardly as the bearing cap travels in the linear path. As soon as the flipper arms begin to move outwardly, the bearing cap has been properly oriented such that an axis X (shown in FIG. 1) extending through mounting holes 14a and 14b is generally perpendicular to the line of travel. At this time, the rear clamping member 56 can be moved inwardly to securely clamp the bearing assembly.

Once the bearing cap assembly has been securely clamped, the bearing cap assembly is moved out of engagement with the hold down bar 66 and into the machining tunnel 40, shown in FIGS. 7 and 8, wherein the bearing cap assembly is held downwardly by means of the hold down bar 44. As the bearing cap is carried through the machining tunnel, the surfaces are cut by the spaced apart broaches 48a and 48b, while simultaneously the bearing cap assembly in urged into positive engagement with the support pin 34 by means of the hold down bar 44.

As shown in FIG. 3, the machining tunnel comprises plurality of individual hold down bars 44 having a length L which is less than the distance C between successive bearing cap assemblies. Thus, an individual hold down bar 44 will only engage a single bearing cap assembly at any one time.

While the present invention has been described for use with respect to a dual broaching arrangement, it will be appreciated that other types of machining operations could be utilized. For example, the dual broaching arrangement could be replaced by a pair of spaced apart milling cutters.

While the present invention has been illustrated and described in what is considered to represent its preferred embodiment, it should be noted that the present invention can be practiced otherwise than as specifically illustrated and described without departing from the scope of the attached claims.

What is claimed is:

1. A method of producing a bearing cap assembly including an open ended bearing cap having a closed end wall with an outer surface secured to a mounting plate located generally parallel to the end wall and having spaced apart opposite end portions extending outwardly past the bearing cap, said method comprising the steps of:
 (a) placing the open end of the bearing cap on a support pin having a stop surface adapted to engage the inner surface of the end wall of the bearing cap;
 (b) moving the support pin having the bearing cap assembly supported thereon in a predetermined direction with the mounting plate located in a plane generally parallel to the direction of travel;

(c) simultaneously with step (b), using a biasing means to exert a force on the bearing cap assembly in a direction perpendicular to the direction of travel to urge the inner surface of the end wall of the bearing cap into positive engagement with the stop surface of the support pin; and (d) simultaneously with step (c), machining the end portions of the mounting plate extending outwardly from the bearing cap to produce spaced apart machined surfaces generally parallel to the direction of travel of the bearing cap assembly.

2. The method according to claim 1 including, subsequent to step (a), the step of positioning the end portions of the mounting plate at a predetermined orientation relative to the direction of travel of the bearing cap assembly.

3. The method according to claim 1 wherein said predetermined direction is a linear path.

4. The method according to claim 1 wherein said machining operation of step (d) is a broaching operation.

5. An apparatus for machining a bearing cap assembly including an open-ended bearing cap having a closed end wall with an outer surface secured to a mounting plate located generally parallel to the end wall and having spaced apart opposite end portions extending outwardly past the bearing cap, said apparatus comprising:

a support pin for receiving the open end of the bearing cap, said support pin having a stop surface adapted to engage the inner surface of the end wall of the bearing cap;

means coupled to said support pin for moving said support pin having the bearing cap assembly supported thereon in a predetermined direction with the mounting plate located in a plane generally parallel to the direction of travel;

biasing means exerting a force on the bearing cap assembly in a direction perpendicular to the direction of travel for maintaining the inner surface of the end wall of the bearing cap in positive engagement with said stop surface of said support pin while said support pin is moved in said predetermined direction; and means for machining the end portions of the mounting plate as said support pin and the bearing cap assembly travel in said predetermined direction 6. The apparatus according to claim 5 wherein said support pin rotatably supports the bearing cap assembly about a support axis generally perpendicular to the direction of travel. and said apparatus further includes positioning means for engaging the bearing cap assembly and rotating the bearing cap assembly to a predetermined position prior to the bearing cap assembly being engaged by said machining means.

7. The apparatus according to claim 6 including clamp means selectively engageable with the bearing cap assembly for maintaining the bearing cap assembly in said predetermined position.

8. The apparatus according to claim 6 wherein said positioning means includes a pair of spaced apart, pivotally mounted flipper arms engageable with the bearing cap assembly, and means for coupling said flipper arms to one another such that pivotal movement of one flipper arm causes similar pivotal movement of the other flipper arm.

9. The apparatus according to claim 5 wherein said means for moving causes said support pin having the bearing cap assembly supported thereon to move in a linear path as the bearing cap assembly is engaged by said machining means.

10. The apparatus according to claim 5 including a plurality of spaced apart support pins each adapted to support a separate bearing cap assembly, and said means for moving includes drive means coupled to each of said support pins for simultaneously moving said support pins along a predetermined path.

11. The apparatus according to claim 10 wherein said biasing means includes a plurality of individual springs for biasing longitudinally extending hold down bars engageable with the bearing cap assemblies, said hold down bars serially positioned along the path of the said support pins, each of said hold down bars having a length less than the minimum spacing between said support pins.

* * * * *